United States Patent
Van Gils et al.

(10) Patent No.: US 9,953,762 B2
(45) Date of Patent: Apr. 24, 2018

(54) CONTACTLESS CONNECTOR, CONTACTLESS CONNECTOR SYSTEM, AND A MANUFACTURING METHOD FOR THE CONTACTLESS CONNECTOR

(71) Applicant: TE Connectivity Nederland BV, 's-Hertogenbosch (NL)

(72) Inventors: Wijnand Van Gils, Raamsdonksveer (NL); Peter Dirk Jaeger, Dussen (NL); Gied Habraken, Valkenswaard (NL); Guus Mertens, Massemen (BE); Saining Ren, Auckland (NZ); Lawrence Bernardo dela Cruz, Auckland (NZ); Rex Pius Huang, Auckland (NZ); Ali Abdolkhani, Auckland (NZ)

(73) Assignee: TE Connectivity Nederland B.V., 'S-Hertogenbosch (NL)

( * ) Notice: Subject to any disclaimer, the term of this patent is extended or adjusted under 35 U.S.C. 154(b) by 0 days.

(21) Appl. No.: 14/407,426

(22) PCT Filed: Jun. 10, 2013

(86) PCT No.: PCT/EP2013/061934
§ 371 (c)(1),
(2) Date: Dec. 11, 2014

(87) PCT Pub. No.: WO2013/186181
PCT Pub. Date: Dec. 19, 2013

(65) Prior Publication Data
US 2015/0170831 A1    Jun. 18, 2015

(30) Foreign Application Priority Data

Jun. 11, 2012    (EP) .................................... 12171536

(51) Int. Cl.
*H01F 17/04*    (2006.01)
*H01F 27/30*    (2006.01)
(Continued)

(52) U.S. Cl.
CPC .............. *H01F 38/14* (2013.01); *H01F 3/10* (2013.01); *H01F 17/045* (2013.01);
(Continued)

(58) Field of Classification Search
CPC .. H01F 38/14; H01F 41/0612; H01F 41/0633; H01F 41/005; H01F 3/10;
(Continued)

(56) References Cited

U.S. PATENT DOCUMENTS 6,008,547 A    12/1999 Dobler et al.
6,950,633 B2 *   9/2005 Kojima ................... H01F 38/18
                                              333/260
(Continued)

FOREIGN PATENT DOCUMENTS

DE    102007036626 A1    2/2009
DE    102008019318 A1    10/2009
(Continued)

OTHER PUBLICATIONS

International Search Report and Written Opinion issued by the European Patent Office, dated Aug. 29, 2013, for International Application No. PCT/EP2013/061934; 12 pages.
(Continued)

*Primary Examiner* — Mangtin Lian
(74) *Attorney, Agent, or Firm* — Faegre Baker Daniels LLP

(57) ABSTRACT

The invention relates to a contactless connector (100), a system including the contactless connector (100) and a corresponding mating connector (200), and a manufacturing
(Continued)

method for the contactless connector. In order to enable the contactless connector (100) to transmit/receive power to/from the corresponding mating connector (200), the invention suggest providing at the contactless connector an inner ferrite element (102) and an inductive coupling element (110) arranged to at least partially surround the inner ferrite element. An outer ferrite element (107) of the contactless connector is arranged to at least partially surround the inductive coupling element (110), wherein a front end (108) of the outer ferrite element (107) facing the mating (101) end of the contactless connector is recessed in an axial direction of the contactless connector with respect to a front end (103) of the inner ferrite element (102) facing the mating end. A rear end (109) of the outer ferrite element (107) is magnetically connected to a rear end (104) of the inner ferrite element (102). An inductive coupling support element (601) is arranged around the inner ferrite element (102). The inductive coupling element is a wire wound around the inductive coupling support element (6019 to form a coil comprising a plurality of coil windings (115). The inductive coupling support element (6019 comprises an outwardly extending intermediate disc that divides the coil windings (115) into a first and a second coil winding section. The intermediate disc (602) has a slot (603) forming a coil wire passageway through which the coil wire is routed.

11 Claims, 9 Drawing Sheets

(51) Int. Cl.

| | | |
|---|---|---|
| *H01F 27/24* | (2006.01) | |
| *H01F 7/06* | (2006.01) | |
| *H01F 38/14* | (2006.01) | |
| *H02J 50/12* | (2016.01) | |
| *H04B 5/00* | (2006.01) | |
| *H02J 5/00* | (2016.01) | |
| *H02J 7/02* | (2016.01) | |
| *H01F 41/00* | (2006.01) | |
| *H01F 3/10* | (2006.01) | |

(52) U.S. Cl.
CPC ............ *H01F 41/005* (2013.01); *H02J 5/005* (2013.01); *H02J 7/025* (2013.01); *H02J 50/12* (2016.02); *H04B 5/0037* (2013.01); *H04B 5/0075* (2013.01); *H04B 5/0093* (2013.01); *Y10T 29/49071* (2015.01)

(58) Field of Classification Search
CPC .. H04B 5/0037; H04B 5/0075; H04B 5/0093; H02J 7/025; Y10T 29/49071
USPC .... 336/90, 105, 220, 198, 212, 221; 29/605; 343/788
See application file for complete search history.

(56) References Cited

U.S. PATENT DOCUMENTS

| | | | |
|---|---|---|---|
| 8,369,780 B2 | 2/2013 | Bauer et al. | |
| 2004/0005809 A1 | 1/2004 | Suzuki | |
| 2009/0085701 A1 | 4/2009 | Veneruso et al. | |
| 2010/0101936 A1* | 4/2010 | Hansson | H02M 7/5381 204/176 |
| 2011/0025264 A1 | 2/2011 | Mochida et al. | |
| 2012/0140525 A1* | 6/2012 | Cuadra | H01F 27/324 363/21.04 |
| 2013/0002390 A1* | 1/2013 | Nam | H01F 27/325 336/207 |
| 2015/0170831 A1* | 6/2015 | Van Gils | H01F 38/14 336/90 |

FOREIGN PATENT DOCUMENTS

| | | | |
|---|---|---|---|
| EP | 0923182 A2 | | 6/1999 |
| GB | 2103886 A | | 2/1983 |
| JP | 2009-189197 A | * | 8/2009 |
| JP | 2009189197 A | | 8/2009 |

OTHER PUBLICATIONS

International Search Report and Written Opinion issued by the European Patent Office, dated Aug. 23, 2013, for International Application No. PCT/EP2013/061933; 14 pages.

\* cited by examiner

CONTACTLESS CONNECTOR, CONTACTLESS CONNECTOR SYSTEM, AND A MANUFACTURING METHOD FOR THE CONTACTLESS CONNECTOR

BACKGROUND

The invention relates to a contactless connector for inductively connecting to a corresponding mating connector, a contactless connector system comprising both connectors, and a manufacturing method for the contactless connector. In particular, the invention provides a contactless connector that includes an inner ferrite core and a coil wound around same. Further, an outer ferrite element is provided that surrounds only parts of the coil. The arrangement of coil and ferrite elements allows to inductively forward/receive electric power to/from a mating contactless connector.

Generally, the invention relates to contactless connectors for inductive power transmission. Contactless power connectors are widely utilized for their various advantages over conventional power connectors, namely for e.g. a higher resistance to contact failures, an unlimited number of mating cycles, a low wear and tear, prevention from electric shocks, sparks and current leaks and their operability under dirty or harsh environments.

Specifically, contactless connectors for power transmission may be used in a variety of industrial devices such as, for instance, robotics technology, rotary applications and molding equipment. Such contactless connectors are required to be operable under hostile environmental influences, to resist a high amount of wear and tear during the mating cycles or may be used for power transmission in humid, explosive or combustible environments.

Known configurations of contactless power connector systems allow for transmission of electrical power between a contactless connector and a mating connector.

However, in case of inductively transmitting a higher power level, a considerable amount of heat has to be taken into account which is generated due to e.g. eddy current. Heat dissipation is thus an important aspect, which however results in a need for appropriate housing materials. Therefore, the outer housing may be of metal, which results in parts of the magnetic field lines tending to flow through the metal housing. Consequently, those field lines inside the housing lead to additional losses. Overall, due to the power losses at the inductive connector, the power transmission decreases.

Moreover, known wireless power connectors require a precise alignment in view of the mating connector part.

Hence, there is a need for an improved contactless connector which remedies the afore-mentioned disadvantages.

SUMMARY

The object underlying the present invention is to propose a contactless connector and a contactless connector system which allows for reduced sensitivity to misalignment between a contactless connector and a mating connector in the mating state while transmitting power therebetween.

Another object of the invention is to suggest a contactless connector and a contactless connector system that transmits power more efficiently so as to allow for reducing the overall length of the contactless connector.

These objects are solved by the subject matter of the independent claims. Advantageous embodiments are subject to the dependent claims.

The present invention provides a contactless connector for inductively connecting at a mating end a corresponding mating connector as defined in claim 1. Advantageously, a closed magnetic loop is established once the contactless connector is coupled to a corresponding mating connector. The contactless connector comprises an inner ferrite element. This element may also be referred to as center ferrite core, which may have a tubular shape, for instance. An inductive coupling element of the contactless connector is arranged to at least partially surround the inner ferrite element and transmits/receives power to/from the corresponding mating connector. An outer ferrite element of the contactless connector is arranged to at least partially surround the inductive coupling element, wherein a front end of the outer ferrite element facing the mating end is recessed in an axial direction of the contactless connector with respect to a front end of the inner ferrite element facing the mating end, and wherein a rear end of the outer ferrite element is magnetically connected to a rear end of the inner ferrite element. The outer ferrite element may also be referred to as outer ferrite core, which may have a tubular shape.

This specific arrangement of the inner ferrite element and an outer ferrite element advantageously may allow an optimized guidance of the magnetic flux and wider flux fields at the head part of the connector, when being inductively coupled to the mating connector. In particular, such that a front end of the outer ferrite core may be recessed with respect to a front end of the center ferrite core in view of a longitudinal axis (also referred to as axial direction L in the following) of the connector.

For example, such particular arrangement of the recessed outer ferrite element allows for a satisfactory coupling even under misalignment situations between a connector and the counter-connector. Another advantage of the inductive element being, for example, only covered by the rear portion (the rear portion is defined as being opposite to the mating end of the contactless connector) of the outer ferrite core, a wide magnetic flux field is provided at the head part of the contactless connector. Hence, a reliable transmission/reception of power to/from the corresponding mating connector may be achieved.

As an example, the inner and outer ferrite elements may mechanically be connected at their respective rear portions so as to form a cross-sectional u-shape with an opening facing the mating end of the contactless connector. Alternatively, the inner ferrite element and the outer ferrite element may, for instance, be integrally provided in a single piece.

According to another advantage of the specific arrangement of the parts of the contactless connector, this configuration, for example, allows for proper power transfer even in case of the coupled connectors are angularly misaligned in view of their longitudinal axes, or in case of lateral/planar mismatch perpendicular to their longitudinal axes. Moreover, the above configuration allows, e.g., for less sensitivity with regards to a varying distance between two inductively coupled connectors. This advantageous effect of the connector having less sensitivity with respect to misalignment may, for instance, be achieved in that a wider flux field is created due to the recessed outer ferrite element.

Further, due to the specific arrangement, the magnetic field lines may not, for instance, create a closed magnetic loop inside the same contactless connector once the mating part is slightly misaligned. Instead, the magnetic field lines may, for instance, still connect to the ferrite elements of the mating connector due to the wider magnetic flux field in a misalignment condition.

The inductive coupling element may as an example only be formed as a coil by using wire, such as for example solid coil wire, multi-stranded coil wire or the like. The wire material can be any material suitable for the described purpose, such as for example copper.

As an example, the contactless connector may be employed as a contactless Ethernet coupler with power transmission. In this regard, the contactless Ethernet coupler at the transmitting side may have an external power input, and the mating contactless Ethernet coupler at the receiving side may have an external power output. A part of the external power input may be branched off at the transmitting and receiving side, respectively, so as to supply the Ethernet circuits at the transmitting side as well as the Ethernet circuits at the receiving side. This may e.g. allow for flexible applications as well as a large range of transmittable power. As a variation, at the transmitting side, the power to be transmitted may, for instance, be inductively obtained from the data lines at the transmitting side. Optionally, external power supply may also be applied for maximum flexibility and an increased transmittable power level.

As another example, the power to be transmitted by such Ethernet coupler may inductively obtained from the data lines of the transmitting side, whereas the received power may be inductively applied to the data lines at the receiving side. Optional external power input at the transmitting side and optional external power output at the receiving side is possible. In a variation of this example, the received power at the receiving side may be used for internal power supply of the receiving side only.

The contactless connector can, for example, also be used in medical environments. In this regard, the connector may be e.g. employed in artificial joints or in human bone structures.

The contactless connector may be, for instance, be provided within a flexible cable, or in a rigid connector case, or an M12 connector case, or a case being thicker and shorter than an M12 connector case, or may e.g. be provided within a square shaped housing, or within an angled case. Also, the connector may e.g. be provided such that the electronic circuits of the connector may be provided in a separate case remote from the mechanical parts of the connector, whereas a flexible cable connects both parts.

As a further example, the contactless connector may be suited for being e.g. operated in environments containing water and/or oil. In this regard, the contactless connector is capable of providing a stable and reliable connection to a mating contactless connector, which may also be operated within watery and/or oily surroundings or be operated outside thereof. For example, the contactless connector may further be formed such that water and/or oil is/are allowed to flow through an inner part of the connector.

The contactless connector of the present invention further comprises an inductive coupling support element arranged around the inner ferrite element. The inductive coupling support element may also be referred to as mounting support, or mounting bracket for the inductive coupling element. For example, the inductive coupling support element may be manufactured of non-conductive/isolating material, such as plastic, resin, or the like. The inductive coupling support element may be arranged around the inner ferrite element such that it contacts at its inner recess the outer surface of the inner ferrite element, i.e. the inner surface of the inductive coupling support element may contact the outer surface of the inner ferrite element. The recess of the inductive coupling support element is preferably an opening extending along the entire length of the inductive coupling support element. According to a particularly preferable embodiment, the inductive coupling support element has a hollow cylinder shape having a circular cross-section with an opening extending along the entire longitudinal axis of the inductive coupling support element.

Advantageously, by means of providing such inductive coupling support element, which may e.g. be provided as a bobbin, the mounting of the coil windings during e.g. an automatic winding process (by a machine, for example) may be significantly simplified. Moreover, the stability of the coil windings may be increased with regards to keeping their position around the inner ferrite element after the manufacturing process. In other words, the coil windings may be firmly held during and after the winding process. In particular, in case of, for example, the front part of the connector comprising more coil winding layers than the rear part of the connector. Preferably at least one layer of coil windings is formed on the outer surface of the support element in the form of a first coil winding layer. Further coil winding layers are preferably formed on top of the first coil winding layer according to the coil requirements.

The inductive coupling support element of the contactless connector of the present invention comprises an intermediate disc with a slot. The intermediate disc (which may also referred to as intermediate wall) advantageously allows, for instance, dividing and separating the different layers of coil windings of the front and rear parts of the contactless connector into different coil winding sections, each section having a preferred number of coil winding layers. The at least one intermediate disc extends outwardly from the outer surface of the inductive coupling support element. That is, the intermediate disc extends in a direction away from the longitudinal axis of the support element. According to a preferred embodiment of the support element it has a hollow cylinder shape and the intermediate disc thus extends along the radial direction thereof. The intermediate disc is preferably arranged between the front and rear end of said inductive coupling support element. The intermediate disc has preferably a circular cross-section. The slot advantageously may allow, for example, the routing of the coil windings during an, for instance, automatic winding process. Thus, the slot forms a coil wire passageway through which the coil wire is routed. The intermediate wall can comprise several such coil wire passageways, i.e. slots. Furthermore, the slot (which may also be referred to a recess of the intermediate disc) may also avoid that the manufactured contactless connector has a greater diameter at the region of the intermediate disc due to the crossed over coil windings between the two sections of the inductive coupling support element, which are divided by the intermediate disc. The slot allows winding of the coil wire through the intermediate wall so that preferably one and the same coil wire forms the various coil winding sections separated by the at least one intermediate wall.

The inductive coupling element of the contactless connector of the present invention is a coil comprising a plurality of windings. For example, the windings may be arranged in at least one layer along an outer surface of the support element. Thus, the inductive coupling element is a wire wound to form a coil comprising a plurality of coil windings. The coil windings are wound around the inductive coupling support element.

According to an advantageous embodiment of the invention which can be used in addition or alternatively to the above the inductive coupling element is radially, preferably symmetric, arranged around the inductive coupling support element. For example, the coil windings may be wound around an outer surface (which faces radially outwards) of inductive coupling support element. Thus, the coil wire of the coil is wound around the outer surface of the support element (e.g. bobbin). According to a particularly preferred embodiment the inductive coupling element, i.e. the coil, is formed such that it forms a cylinder shape and thus has a circular cross-section. Since the coil is wound around the support element that preferably has a hollow cylinder shape, also the coil's preferred shape is a hollow cylinder shape.

According to an advantageous embodiment of the invention which can be used in addition or alternatively to the above, the coil comprises more winding layers in a first section at a front part of the inner ferrite element that is not surrounded by the outer ferrite element than in a second section at a rear part of the inner ferrite element that is surrounded by the outer ferrite element.

Advantageously, providing more coil layers at the front section of the inner ferrite element allows for a concentration of windings at those part of the inner ferrite element which is not covered by the outer ferrite element. Having more layers of coil windings in the front section allows for an increased efficiency of power transmission. Hence, the overall length of the contactless connector can be reduced while maintaining or even increasing the maximum allowed transfer power level compared to a connector with evenly distributed coil layers.

According to another advantageous embodiment of the invention which can be used in addition or alternatively to the above, the coil comprises an even number of layers in the first and second sections. This allows for, among others, a cost efficient assembly of such a contactless connector.

According to an advantageous embodiment of the invention which can be used in addition or alternatively to the above, a non-conductive cover element of the contactless connector is arranged to surround the inner ferrite element, the inductive coupling element and at least part of the outer ferrite element. For instance, the non-conductive cover element may be a pre-fabricated cover member for mounting the same onto the connector.

According to a particular preferred embodiment of the invention, the non-conductive cover element is an overmold. For instance, the non-conductive cover element may be provided by an overmolding process, such as, for example, an injection molding process. By overmolding the ferrite elements and coil windings in order to form such an overmold cover element, the stability of the entire connector can be improved.

According to another advantageous embodiment of the invention which can be used in addition or alternatively to the above, the contactless connector may comprise a housing element which is spaced from the rear end of the outer ferrite element by a predetermined distance with regard to the axial direction L of the contactless connector.

Advantageously, such configuration of having a gap between the outer ferrite element and the housing element allows, for instance, significantly reduces an eddy current, which may occur within the housing element. The reduction of the eddy current may e.g. reach a level, where the current loss is negligible. By gap G the distance between the back surface of the outer ferrite element and the front surface of the housing elements is meant, i.e. the distance measured along the longitudinal axis of the connector. It is preferable to set the distance between the back surface of the outer ferrite element and the front surface of the housing element between 2 to 3 mm in order to achieve even better results.

According to a further preferred embodiment the contactless connector comprises at least one antenna element. The antenna signal can be transmitted at a preferred carrier frequency, such as 60 GHz or 2.4 GHz. The antenna element is preferably arranged within the contactless connector and can, for example, be arranged in between the mating end of the contactless connector and the front end of the inner ferrite element. The mating end is, for example, to be understood as a front side of the inductive coupling support element, wherein the plane of the front side is perpendicular to the axial direction L of the contactless connector. Alternatively, the antenna element can be arranged behind the inner and/or outer ferrite element with respect to the mating end of the contactless connector. This arrangement behind the inner and/or outer ferrite element is, for example, to be understood as that the inner and/or outer ferrite element is in-between the antenna element and the mating end of the contactless connector.

The antenna element is for example a loop antenna, a parabolic antenna, dipole antenna, directional antenna, or any other suitable antenna type. In case of a loop antenna type, it is preferred to optimize the same for near end communication, such that the data transmission is only enabled within a short range, e.g. 10 mm or less. Such loop antenna type element is beneficial since it has reduced cross-talk properties and also reduced interference with other electronic devices as well as neighboring other contactless connector pairs.

The antenna is moreover, for example, electrically connected to an electronic circuit which is arranged in a rear part of the contactless connector for transmission and/or for receiving radio waves. For instance, the antenna may directly be connected by an antenna connection line in a right angle. This may further reduce the space requirement of the antenna element in the longitudinal direction of the contactless connector. In case the antenna element is arranged at the mating end of the contactless connector, the connection in a right angle may for example result in the antenna being arranged close to the inner ferrite element, thereby, among others, resulting in a compact structure of the contactless connector.

Advantageously, implementing the antenna element in front of the front end of the inner ferrite element allows for a short distance to the antenna element of the mating connector. Thus, less transmission power is required, thereby allowing reducing interference with other electronic parts in the vicinity of the connector.

According to an advantageous embodiment of the invention which can be used in addition or alternatively to the above, the contactless connector comprises an antenna connection line for connecting the antenna element, wherein the antenna connection line is routed through the ferrite element. This preferred embodiment suggests routing the antenna signal or antenna "information" through the ferrite core, preferably through the inner ferrite core. Such a connection line can, for example, be formed by an antenna rod arranged within the inner ferrite element opening, in case the at least one antenna element is arranged behind the inner and/or outer ferrite element with respect to the mating end. This preferred design utilizing the antenna rod has shown advantageous results for a carrier frequency of approximately 60 GHz. In case the antenna element is arranged at the mating end of the connector, a connection line is preferably routed through the inner ferrite core. Both arrangements avoid, for example, the necessity of providing the connection line or other connection means e.g. at the radial outer parts of the contactless connector. In case of the connection line, the necessary length thereof may e.g. be kept to a minimum so that transmission/reception of signals may be improved.

The present invention further provides a contactless connector system comprising a contactless connector according to one of the previously described embodiments and a corresponding mating connector connected to the contactless connector such that the contactless connector allows for transmitting/receiving power to/from the corresponding mating connector.

The present invention further provides a method for manufacturing a contactless connector as defined in the independent method claim 11. The inner ferrite element may be inserted into the recess, preferably into an opening (e.g. hole) of the inductive coupling support element either before or after the arrangement of the inductive coupling element around the inductive coupling support element. Preferably the inner ferrite element is inserted into an opening of an inductive coupling support element that has a hollow cylinder shape with a circular cross-section with the opening extending along the entire longitudinal axis of the support element.

An advantageous aspect of the method is that it allows for a full automatic assembly of the parts mentioned. Hence, a cost efficient manufacturing of the contactless connector is thereby enabled.

According to a further preferred embodiment of the method, the coil winding process starts and ends at the same end of the inductive coupling support element. Preferably the entire coil is formed during a continuous operation during which one and the same coil wire is wound to form the various coil winding sections that are separated by at least one intermediate wall. For example, in case of forming a coil on a support element comprising only one intermediate disc with only one slot, the coil wire is preferably routed through the same slot twice during the process of forming the entire coil, i.e. during formation of all coil winding sections of the coil. In case of an embodiment comprising an intermediate wall with two slots, the coil wire is preferably routed through each slot once during the coil forming process.

The accompanying drawings are incorporated into the specification and form a part of the specification to illustrate several embodiments of the present invention. These drawings, together with a description, serve to explain the principles of the invention. The drawings are merely for the purpose of illustrating the preferred and alternative examples of how the invention can be made and used, and are not to be construed as limiting the invention to only the illustrated and described embodiments. Furthermore, several aspects of the embodiments may form—individually or in different combinations—solutions according to the present invention. The following described embodiments thus can be considered either alone or in an arbitrary combination thereof. Further features and advantages will be become apparent from the following more particular description of the various embodiments of the invention as illustrated in the accompanying drawings, in which like references refer to like elements, and wherein:

DETAILED DESCRIPTION

FIGS. 1 to 5 and 12 show a first preferred embodiment of the contactless connector, whereas FIGS. 6 to 11 show a second preferred embodiment of a contactless connector. Similar parts, elements and/or structures in both embodiments may be denoted by the same reference signs in the following description.

Figures 1A, 1B:
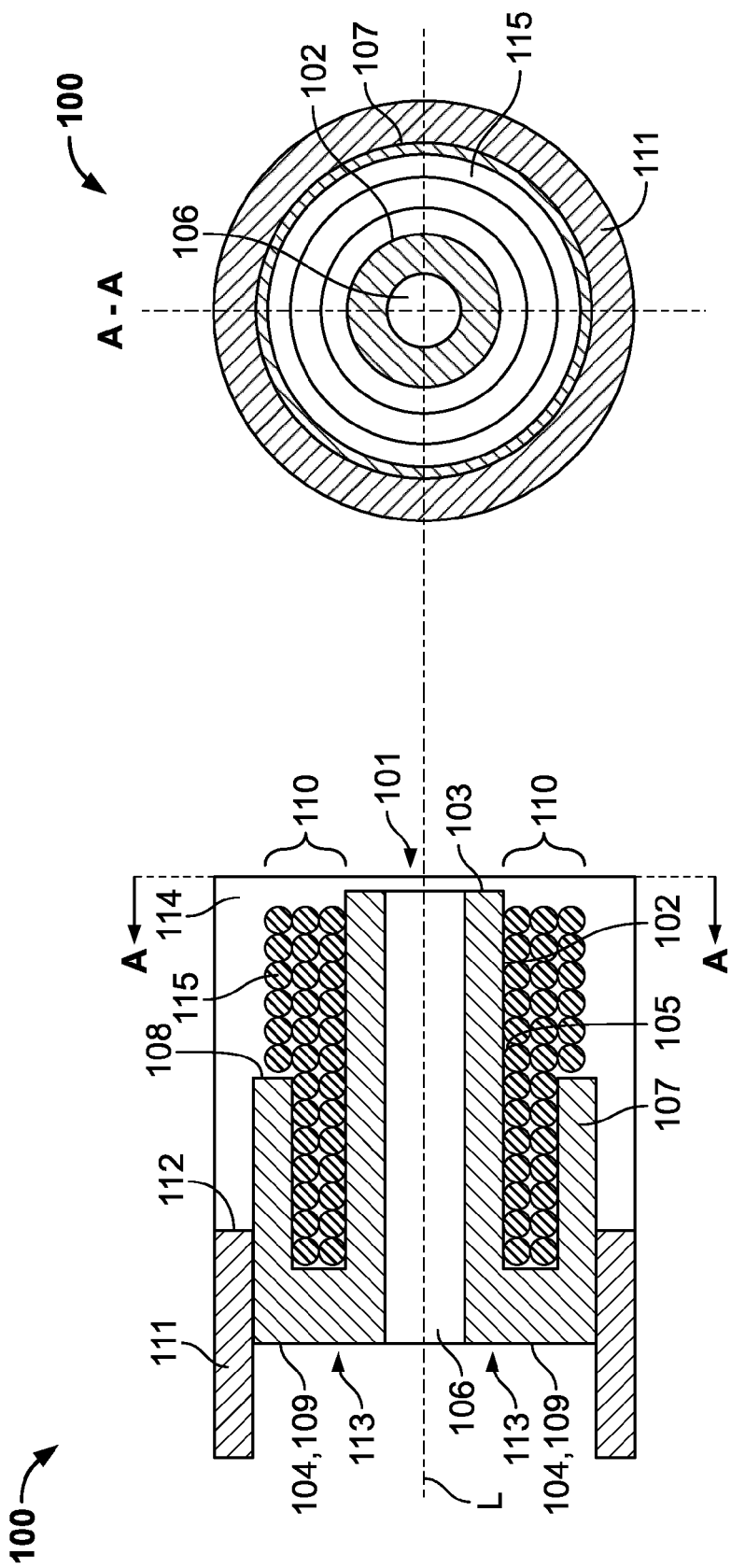
FIGS. 1a and 1b schematically show a sectional view of a contactless connector along a longitudinal axis, a detailed view showing the cross-section of the contactless connector along the line A-A according to a first exemplary embodiment of the invention.

Referring to FIG. 1a, a sectional view of a contactless connector 100 along a longitudinal axis is illustrated. Furthermore, FIG. 1b illustrates a cross-section of the contactless connector 100 of FIG. 1a along the line A-A.

In the following, the term contactless connector is used. It should be noted that a contactless connector may also be a contactless plug connector.

According to the sectional view of the contactless connector 100 of FIG. 1a, the illustration shows the front end assembly of the contactless connector 100. The front end assembly is symmetrical with respect to the axis (longitudinal axis) as shown by the horizontal dotted line of FIG. 1a. In other words, the contactless connector 100 is circularly arranged around the axis. The circular arrangement of the connector can especially be derived from the cross sectional view of FIG. 1b.

As further shown in FIG. 1a, the contactless connector 100 comprises an inner ferrite element 102 which has preferably a tubular shape so that the inner ferrite element 102 is closely arranged around the center axis, i.e. The longitudinal axis as shown by the horizontal dotted line. Due to the tubular shape, the inner ferrite element 102 comprises a cylindrical opening along the longitudinal axis. This is also referred to as hollow opening 106 of the inner ferrite element 102 in the following.

Moreover, the contactless connector 100 comprises an outer ferrite element 107 that is also symmetrically arranged around the longitudinal axis. The outer ferrite element 107 is also tubular shaped with a diameter that is larger than that of the inner ferrite element 102. Such difference in diameters results in a space between the outer surface of the inner ferrite element 102 and the inner surface of the outer ferrite element 107.

As can further be seen from FIG. 1a, the length of the outer ferrite element 107 in view of the longitudinal direction L (parallel to the longitudinal axis) is shorter than the length of the inner ferrite element 102 along the longitudinal axis. In other words, a front end 108 of the outer ferrite element 107 is recessed with respect to a front end 103 of the inner ferrite element 102. Thereby, the expression "front end" denotes the tip of the contactless connector 100 that faces a mating end 101 of the connector 100. The mating end 101 is defined as that end of the contactless connector 100 that faces a counter-part connector, i.e. a mating connector 200 (mating contactless connector 200). Thereby, the counter-part contactless connector 200 is that part which receives power transmitted by the contactless connector 100 as shown in FIG. 1a.

Further, according to the embodiment, the specific arrangement of the front end 108 of the outer ferrite element 107 being recessed with respect to the front end 103 of the inner ferrite element 102 results in the effect of having an improved coupling behavior between the contactless connector 100 and the corresponding mating connector 200. That is, recessing the outer ferrite tube element 107 leads to less sensitivity to misalignment of the contactless connector 100 and the corresponding mating connector 200. This will be further described in connection with FIG. 2.

In addition, FIG. 1a shows that the rear end 109 of the outer ferrite element 107 and the rear end 104 of the inner ferrite element 102 are magnetically connected. This may for instance be a magnetic connection between the outer and inner ferrite elements having an air gap in between. According to an exemplary realization of this embodiment, the outer and inner ferrite elements 107, 102 may be integrally provided in one single piece, as shown in FIG. 1a. However, in a further exemplary realization of this embodiment, the outer and inner ferrite element, respectively, may also be comprised of a plurality of ferrite (block) elements which do not comprise an air gap between the elements and are mechanically contacted to each other. This contact may for instance be an adhesive contact or soldered, glued or bonded by various means. According to another exemplary realization of this embodiment, the outer and inner ferrite element, respectively, may be comprised of a plurality of ferrite pieces (ferrite block elements) with one or more air gaps in between. According to another exemplary realization of this embodiment, either the outer ferrite element 107 or the inner ferrite element 102 is integrally provided in one single piece (that is, fabricated in one piece), whereas the respective other one is comprised of a plurality of ferrite blocks/pieces.

According to the embodiment relating to FIG. 1a, the inner ferrite element 102 and the outer ferrite element 107, which are connected at their respective rear portions, form a cross-sectional U-shape having an opening at the front end of the contactless connector 100 with respect to a sectional view along the longitudinal axis as illustrated in FIG. 1a.

As to the inner ferrite element 102, same may be a tubular shaped element, which is the core ferrite element, that has in an exemplary embodiment an outer diameter of 4 millimeters+/−0.1 millimeter and an inner diameter of 2 millimeters+/−0.3 millimeters and a length of 12 millimeters+/−0.6 millimeters.

The outer ferrite element 107, which may also have a tubular shape, has in an exemplary embodiment a length of 6 millimeters+/−0.15 millimeters, an outer diameter of 9 millimeters+/−0.4 millimeters and an inner diameter of 7 millimeters+/−0.3 millimeters.

Furthermore, the inner and outer ferrite elements may be provided integrally in a single piece according to an exemplary realization of the embodiment.

According to another exemplary realization of the embodiment, the inner ferrite element 102 may further comprise a socket disc (which denotes the rear part of the inner ferrite element 102 or, in other words, the rear part of the entire ferrite core assembly), wherein this socket disc may have a thickness of 2 millimeters+/−0.3 millimeters on which the, for instance, tubular shaped outer ferrite element 107 is mounted thereon in the axial direction L.

In accordance with the above described exemplary realization, including the above-mentioned dimensions of the inner and outer ferrite elements, there may be two layers of coil windings 115 around the inner ferrite element 102 beginning at the rear end of the U-shaped opening (with respect to the sectional view of FIG. 1a) of both ferrite elements of the contactless connector 100. As further exemplarily shown in FIG. 1a, there may be three layers of coils windings 115 around the inner ferrite element 102 in an area where the coils windings 115 are not surrounded by the outer ferrite element 107 in the longitudinal direction L.

In a further exemplary implementation of the embodiment, the contactless connector 100 comprises a housing element 111 (as further illustrated in FIG. 1a), which may be, for instance, located outside the outer ferrite element 107. That is, the housing element 111 may contact, according to this first exemplary implementation of the embodiment, the outer surface of the outer ferrite element 107. Hence, the diameter of the housing element 111 is larger than the diameter of the outer ferrite element 107. The housing element 111 may be employed so as to provide a sufficient level of heat dissipation and/or additional stability of the connector arrangement. According to an exemplary realization of the embodiment, the housing element 111 may, for instance, be of metal. If selecting metal as the material, the housing element 111 may also act as a shielding element for circuitry provided inside the connector.

Moreover, it should be noted that the specific area of the housing 111 that directly contacts the outer surface of the outer ferrite element 107 is directional proportional to the standing loss i.e. eddy current caused. Hence, reducing this contact area, which is achieved by recessing the front end 112 of the housing 111 with respect to the front end 108 of the outer ferrite element 107 (and thus also with respect to the front end 103 of the inner ferrite element 102), results in a reduction of the eddy current. Thereby, the efficiency of the power transmission of the connector can significantly be increased.

According to a further exemplary realization of the embodiment, the housing element 111 of the contactless connector 100 may be provided of copper, aluminum, nickel, tin or an alloy thereof such as brass (55-86% copper). Also, the housing 111 may be nickel plated.

According to another exemplary realization of the embodiment, the housing element 111 may, for instance, be of plastic. Such realization would reduce the manufacturing costs while providing satisfactory mechanical stability of the connector.

According to this first embodiment, the housing element 111 as shown in FIG. 1a is recessed with respect to the outer ferrite element 107. In more detail, the front end of the housing is recessed in the axial direction L of the connector 100 with respect to the front end 108 of the outer ferrite element 107.

In the above description, the expression "recessed" has been used so as to demonstrate the different lengths/positions of the inner ferrite element 102, the outer ferrite element 107 and the housing element 111 along the longitudinal axis. However, these specific relations may also be described in that the outer ferrite element 107 protrudes from the housing element 111 by a specific length in the axial direction L. Further, with respect to the dimensions in the axial directions of the ferrite elements, FIG. 1a shows that the inner ferrite element 102 protrudes from the outer ferrite element 107 towards the mating end 101 of the contactless connector 100 in the axial direction L.

According to the embodiment that relates to FIG. 1a, the contactless connector 100 further comprises an inductive coupling element 110 which surrounds the inner ferrite element 102. This inductive coupling element 110 is used for transmitting or receiving power to or from a corresponding mating connector 200. Although not shown in FIG. 1a, this inductive coupling element 110 may receive electrical power from a supply line of an electronic circuit 401 (also not shown) so that current flows through the inductive coupling element 110. In combination with the ferrite elements, the inductive coupling element 110 establishes an electromagnetic field which then is received by an inductive coupling element of the corresponding mating connector 200.

In an exemplary realization of this embodiment, the inductive coupling element 110 may be at least one coil layer. Alternatively, the inductive coupling element 110 according to another exemplary realization of this embodiment may be comprised of coil windings (the material may, for instance, be copper) which are provided around the inner ferrite element 102 and partially covered by the outer ferrite element 107. As illustrated in FIG. 1a, different amount of layers (at least one layer) of such coil windings 115 may be used for the inductive coupling element 110. Although FIG. 1a shows coil windings, this merely exemplarily shows one implementation of the inductive coupling element 110 of the embodiment. The inductive coupling element 110 may also comprise at least one foil layer, such as e.g. a copper foil layer, instead of the coil windings 115 illustrated in FIG. 1a.

According to the embodiment that relates to FIG. 1a, the inductive coupling element 110 may only be partially covered/surrounded by the outer ferrite element 107. That is, the inductive coupling element 110 may be surrounded by the outer ferrite element 107 in a rear portion/rear end of the inner ferrite element 102, whereas the inductive coupling element 110 is not surrounded/not covered by the outer ferrite element 107 in a front part of the inner ferrite element 102, wherein the front part/front end is defined as that part which faces the mating end 101 of the contactless connector 100.

Furthermore, according to another exemplary realization of this embodiment, the coil comprises more winding layers in a first section (which is located at the front part/end 103 of the inner ferrite element 102) than in a second section (which is located at the rear part of the inner ferrite element 102). This specific arrangement of coil windings can be seen in FIG. 1a. For instance, the inner ferrite element 102 may be surrounded by two coil winding layers with respect to the entire length of the inner ferrite element 102 in the axial direction L, whereas the front part of the inner ferrite element 102 may be surrounded by three layers of coil windings. It should be noted that the amount of coil winding layers at the front part/end is not limited to three layers, but is preferably more than the number of coil winding layers that surround the rear part of the inner ferrite element 102.

Moreover, the specific arrangement of providing more winding layers at the front portion of the inductive coupling element 110, as described in the exemplary realization of this embodiment, allows for an increase of efficiency which also results in the advantage and technical effect of increasing the transmittable power per volume ratio at the contactless connector 100. As the efficiency of the power transmission is improved by the above specific arrangement, a significant reduction of the overall length of the front end assembly of the contactless connector 100 is achieved. For example, the above described contactless connector 100 may have a front end diameter of 10.5 millimeters, a front end assembly length of 12 millimeters and be capable of transferring power at a 10-15 Watt level with high efficiency.

In a further exemplary realization of the embodiment, the contactless connector 100 may additional comprise a non-conductive cover element 114, which may be provided of resin, plastic or the like, wherein the non-conductive cover element 114 is arranged to surround the inner ferrite element 102, the inductive coupling element 110 and at least parts of the outer ferrite element 107. The non-conductive cover element 114 may also entirely cover the outer ferrite element 107 in case no housing element 111 is provided at the contactless connector 100.

According to a further exemplary realization of the embodiment, in case of a housing element 111 being provided at the contactless connector 100, the non-conductive cover element 114 may substantially cover that front part of the outer ferrite element 107 which is not covered by the housing, as well as that part of the inductive coupling element 110 which is not covered by the outer ferrite element 107, as well as the front surface (which is perpendicular to the axial direction) of the mating end 101 of the contactless connector 100. Further, as shown in FIG. 1a, the non-conductive cover element 114 covers the above-described parts of the contactless connector 100 so that the resulting contactless connector 100 has a cylindrical shape with the diameter of the housing element 111, whereas the front portion of the non-conductive cover element 114 extends beyond the front end 103 of the inner ferrite element 102 by a certain amount with respect to the longitudinal axis direction L.

According to another exemplary realization of the embodiment, wherein, in case the contactless connector 100 comprises a housing element 111, at least a part of the non-conductive cover element 114 is overlapped by the housing element 111.

According to an exemplary realization of the embodiment, the distance between the front end 112 of the housing 111 and the front end 108 of the outer ferrite element 107 may, for instance, be 4 millimeters approximately. Further, the distance between the front end 103 of the inner ferrite element 102 and the front end 108 of the outer ferrite element 107 may be 5 millimeters approximately. Following from that, the distance between the front end 112 of the housing 111 and the front end 103 of the inner ferrite element 102 may, for instance, be 9 millimeters approximately. Moreover, the overall length of the front end assembly, which denotes the overall length in the axial direction L measured from the front end 103 of the inner ferrite element 102 to the rear end 113 of the ferrite elements may, for instance, be approximately 12 millimeters.

Overall, as described in the various exemplary implementations of the embodiment, the advantages of increasing the efficiency of power transmission as well as of reducing the sensitivity to misalignment of the connector 100 in the mating state is achieved by at least arranging the inner ferrite element 102 such that same protrudes from the outer ferrite element 102. In other words, these advantages are achieved by recessing the front end 108 of the outer ferrite element 107 with respect to the front end 103 of the inner ferrite element 102.

Further increase of the efficiency of power transmission, which allows a reduction of overall length of the connector, is achieved by additionally providing more coil windings in the front portion of the contactless connector 100.

Additionally implementing a (metal) housing element 111 which is recessed with respect to the outer ferrite element 107 has the effect of reducing loss of current, such as eddy current, significantly as the area of those parts of the housing 111 which directly surround or contact the outer ferrite element 107 is reduced. In other words, the area/surface of the housing 111 in which the magnetic field may cause eddy current/heat, is reduced.

It is noted that in this exemplary first embodiment, it is described that the housing element 111 overlaps a part of the outer surface of the outer ferrite element 107. However, the housing element 111 may also be further recessed with respect to the rear end 109 of the outer ferrite element 107 so as to not have an overlap i.e. to not have a direct contact between the housing element 111 and the outer ferrite element 107. This is subject to the second exemplary embodiment according to FIGS. 6 to 11 which are described below.

As mentioned above, FIG. 1b illustrates a cross-section of the contactless connector 100 of FIG. 1a along the line A-A.

As can be seen from FIG. 1b, the non-conductive cover element 114 has been omitted so as to illustrate the housing element 111, the inner and outer ferrite elements 102, 107 and the inductive coupling element 110 as already described in detail in connection with FIG. 1a. Although FIG. 1b shows parts of the outer ferrite element 107, this only exemplarily demonstrates that the inductive coupling element 110, which is exemplarily shown in FIG. 1b as coil windings 115, have a smaller outer diameter than the outer diameter of the tubular shaped outer ferrite element 107. However, it is noted that according to another exemplarily realization of the embodiment, the outer diameter of the inductive coupling element 110 of the contactless connector 100 may be equal to the diameter of the outer ferrite element 107.

Figure 2:
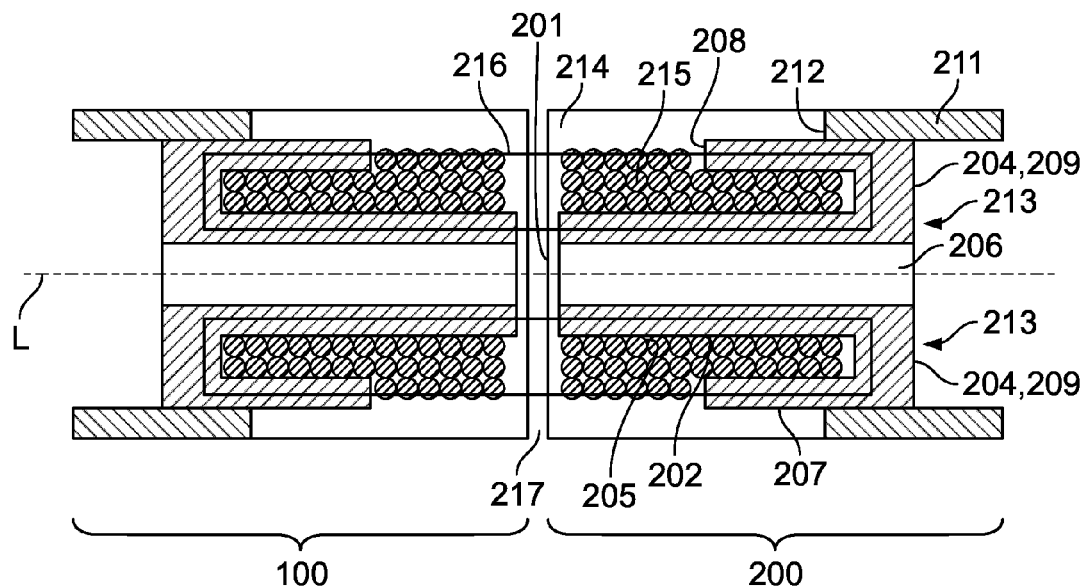
FIG. 2 schematically shows a sectional view of the contactless connector and a corresponding mating connector along a longitudinal axis according to the first exemplary embodiment of the invention.

FIG. 2 shows a sectional view, along a longitudinal axis, of the contactless connector 100 and a corresponding mating connector 200 in a mating state, according to an embodiment of the invention. Such configuration is also referred to as contactless connector system according to the invention.

As can be seen from the figure, a contactless connector 100 and a mating connector 200 are arranged oppositely to each other and aligned along the longitudinal axis (horizontal dotted line). That is, the respective mating ends 101/201 of the connectors face each other while having an air gap 217 between the mating ends 101/201. As an example, the air gap 217 may be approximately 5 millimeters. As indicated by the magnetic field lines 216, in the mating state of the connectors, a closed magnetic loop is established. Due to the recessed outer ferrite elements 107/207 of both illustrated connectors, it is achieved that the field lines 216 tend to keep magnetically connecting the outer ferrite elements 107/207 of both contactless connectors 100/200, even in case of the connectors being planar misaligned in the direction perpendicular to the longitudinal axis. Also, the magnetic field lines 216 flowing in the inner ferrite elements 102/202 of both connectors are prevented from creating a closed magnetic loop inside the respective same contactless connector in case of such planar misalignment between the two connectors. In more detail, the magnetic field lines 216 are prevented from flowing back from the outer ferrite element 107 into the inner ferrite element 102 within contactless connector 100, (and the same for the mating connector), in case of such planar misalignment between the two connectors.

Hence, it is apparent that the illustrated configuration allows for proper power transfer not only in case of lateral/planar mismatch perpendicular to their longitudinal axes, but also even in case of the coupled connectors being angularly misaligned in view of their longitudinal axes. According to the above described implementations of the embodiment, the configuration thus also allows for less sensitivity with regards to varying distance (air gap) between two inductively coupled connectors.

The effect of having less sensitivity in an misalignment condition of the inductively connected connectors can basically seen as a result from the establishment of a wider flux field due to the recessed outer ferrite elements 107/207 compared to a case where the outer ferrite elements would not be recessed.

Figure 3:
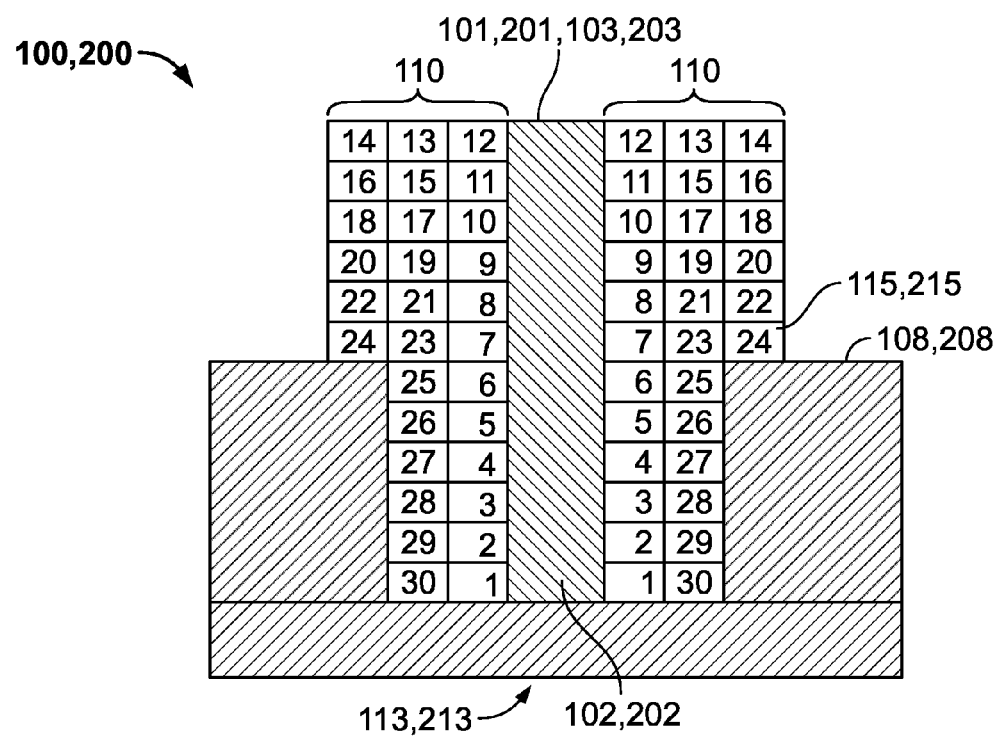
FIG. 3 schematically shows a winding order of the inductive coupling element of the contactless connector in a sectional view along a longitudinal axis of the contactless connector according to the first exemplary embodiment of the invention.

FIG. 3 shows a winding order of the inductive coupling element 110 of the contactless connector 100 in a sectional view along a longitudinal axis of the contactless connector, according to further exemplary embodiment of the invention.

Each rectangle in FIG. 3 comprising a number schematically represents the cross-section of a coil winding 115 (which actually would have a circular shape).

As to the winding order description, the winding starts and ends at the inner rear portion (inner side that is opposite to the mating end 101 of the connector 100) of the U-shaped inner and outer ferrite elements (this inner rear portion may also be referred to as side of the ferrite core base (disc) of the ferrite elements that is opposite to the mating end 101 of the connector 100).

In a first step, the first and inner most layer starts from the ferrite core base (disc), wherein a coil 115 is wound around the inner ferrite element 102 into the direction of the mating end 101 front end of the inner ferrite element 102.

In a second step, a second layer of coil windings is created by winding the coil 115 at the tip of the inner ferrite element 102 followed by a third layer at the tip of the inner ferrite element 102.

Subsequently, the second step is repeatedly performed (coil windings are alternately arranged in the two different layers) in the direction to the inner rear portion of the ferrite elements until reaching the front end 108 of the outer ferrite element 107. This may, for instance, result in a 6×3 layer of coil windings 115.

After that, in the next step, it is continued with winding the coil 115 only in the second layer until reaching the ferrite core base (disc), which is the inner rear portion of the ferrite elements.

Figure 4:
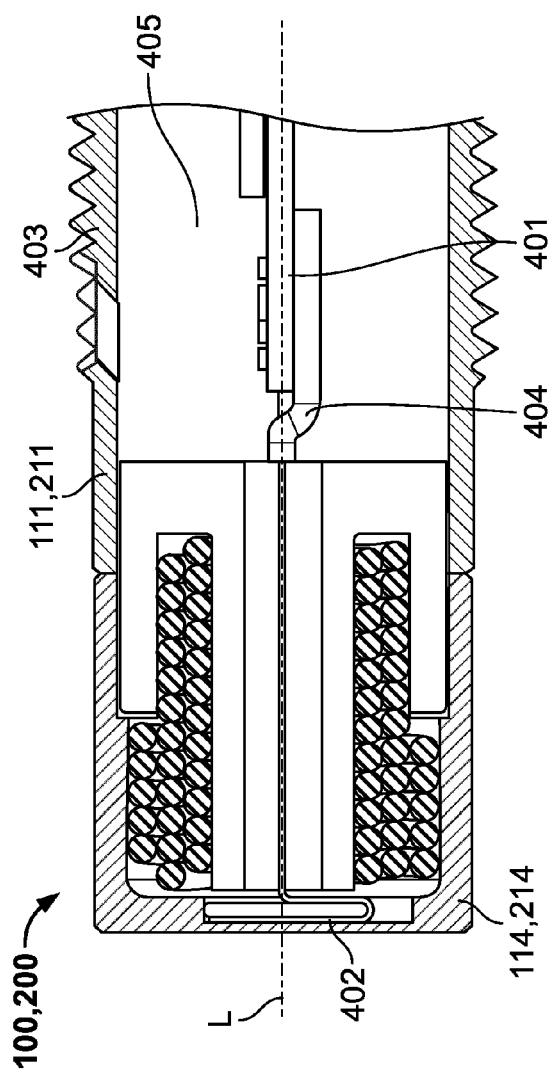
FIG. 4 schematically shows a sectional view of the contactless connector along a longitudinal axis, according to the first exemplary embodiment of the invention.

FIG. 4 schematically shows a sectional view of the contactless connector 100 along a longitudinal axis, according to a further exemplary embodiment of the invention.

FIG. 4 shows an antenna configuration including an antenna element 402 located in the front portion of the connector 100. The antenna element 402 is of loop antenna type.

The antenna element may, e.g., be mounted between the mating end 101 of the contactless connector 100 and the front end 103 of the inner ferrite element 102. For example, the antenna element 402 may be implemented (molded within) in the non-conductive cover element 114 at the front end of the contactless connector 100. Such antenna element 402 allows for a wireless data transfer independent from the power transmission between two mated connectors. The antenna may, for example, provide high data rate transfer up to a distance of 5 millimeters in the longitudinal direction towards the mating connector. In another exemplary realization, the antenna may be implemented as an RF near field antenna coupling element.

According to an exemplary implementation of the embodiment, the connection line of the antenna element 402 may be fed through the hollow inner portion 106 of the inner ferrite element 102 so as to be electrically connected to an electronic circuit 401 (being located in a rear part of the contactless connector 100) for transmission and/or for receiving radio waves. The hollow center of the ferrite core (inner ferrite element 102) thus provides a path for an impedance controlled transmission line towards the antenna element 402 at the front of the contactless connector 100.

Advantageously, implementing the antenna element 402 in front of the front end 103 of the inner ferrite element 102 allows for a short distance to another antenna element 402 of the corresponding mating connector 200. Thus, less transmission power is required, thereby reducing interference with other electronic parts in the vicinity of the mated connectors.

Figure 5:
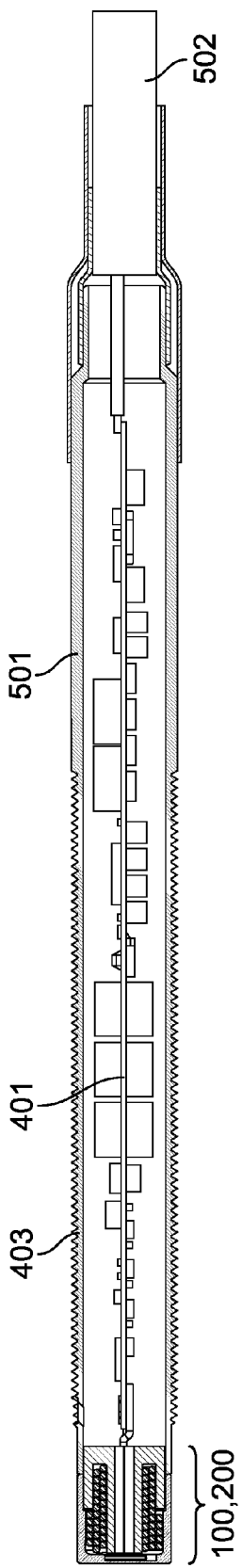
FIG. 5 schematically shows a sectional view of a contactless connector incorporated in a tubular housing, along a longitudinal axis, according to the first exemplary embodiment of the invention.

According to a further exemplary implementation of the embodiment, a vacuum assisted potting 405 may be provided behind the rear end of the ferrite elements of the contactless connector 100 so as to allow completely filling the front end assembly of the contactless connector 100 and to provide stability and solid integration of the assembly within the tube housing of the entire connector (see also FIG. 5).

FIG. 4 shows the coil power supply line 404 between the ferrite elements and the electronic circuit 401. The coil power supply line 404 supplies current to the coil windings 115 of the inductive coupling element 110.

The connector case 501 as shown in FIG. 5, may for instance be of a material with high electrical conductivity (for low eddy current loss) and thermal conductivity (for good heat spread), in particular at the area of the case 501 which is near the inner and outer ferrite elements 102, 107.

According to a further exemplary implementation of the embodiment, a thread 403 may be provided on the outer surface of the housing 111. For instance, if implementing the connector as an M12 connector, an M12 connector thread may be provided.

FIG. 5 schematically shows a sectional view of a contactless connector 100 incorporated in a tubular connector case 501, along a longitudinal axis, according to another exemplary embodiment of the invention.

The entire connector arrangement provided in the tubular connector case 501 may comprise, for example, the contactless connector 100, as shown in FIGS. 1 to 4, being incorporated at the front/head section of the illustrated connector case 501, the electronic circuit 401 surrounded by the tubular connector case 501, a thread 403 at the outer surface of the tubular connector case 501, and a connection interface 502 at the rear end of the tubular connector case 501, allowing connection to further circuitry (not shown). According to a further exemplary implementation of the embodiment, the tubular connector case 501 may be implemented as a contactless M12 connector. In such case, the tubular connector case 501 has a small M12 form factor, whereas the thread 403 at the outer surface of the tubular connector case 501 may be an M12 connector thread.

In one exemplary implementation, the outer diameter of the M12 connector shown in FIG. 5 may approximately be 10.5 millimeters at the front end (head part of the connector). Further, the outer diameter of the tubular connector case 501 of the M12 connector shown in FIG. 5 may approximately be 12.5 millimeters, whereas the inner diameter of the tubular connector case 501 of the M12 connector shown in FIG. 5 may approximately be 9.6 millimeters.

Following FIGS. 6 to 11 show a second preferred embodiment of the invention. Features of this second embodiment that are similar to those of the first embodiment will not be repeated in the following. Hence, same reference signs used in the first and second embodiment described similar parts.

Figure 6:
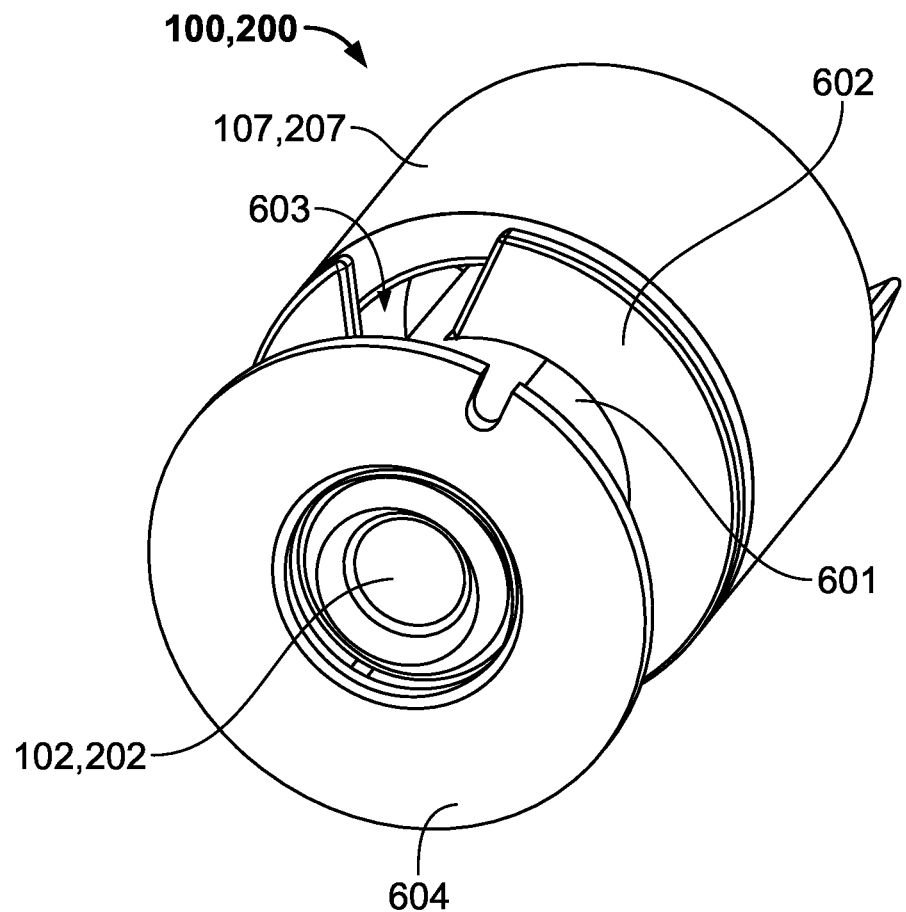
FIG. 6 schematically shows a perspective view of a contactless connector, according to a second exemplary embodiment of the invention.

FIG. 6 schematically shows a perspective view of some parts of a contactless connector 100, in particular an inductive coupling support element 601 according to this second embodiment.

As can be seen in this figure, the inductive coupling support element 601 is circularly arranged around the inner ferrite element 102. Therefore, the inductive coupling support element 601 comprises a cylindrical recess or opening (e.g. hole) along its longitudinal axis (which is the axial direction L of the contactless connector 100) so as to allow accommodating of the inner ferrite element 102 in the recess or opening.

Further, as can be seen from FIG. 6, the inductive coupling support element 601 comprises a front disc 604 which is arranged such that the plane of the front disc 604 is perpendicular to the axial direction L of the contactless connector 100. The front disc 604 is provided at the mating end 101 side of the contactless connector 100.

Moreover, as shown in FIG. 6, the inductive coupling support element 601 comprises an intermediate disc 602 which is arranged such that the plane of the intermediate disc 602 is also perpendicular to the axial direction L of the contactless connector 100.

However, the intermediate disc 602 is displaced from the front disc 604 towards the rear end of the contactless connector 100 along the axial direction L of the contactless connector 100, thereby forming a space between the front and intermediate discs 604, 602. The space formed by said discs 602, 604 provides an area in which coil windings can be arranged. In particular, the provision of front and intermediate discs 604, 602 facilitates the mounting of coil windings 115 by an automatic mounting process. Furthermore, such discs 602, 604 allow to firmly keep the mounted coil windings 115 in their respective positions after manufacturing.

In order to allow a connection of the coil windings 115 to and from the area between the front disc 604 and the intermediate disc 602, a slot 603 is provided at the intermediate disc 602. The slot 603 may be a small notch or groove with respect to the outline of the intermediate disc 602, or may reach to that surface of the inductive coupling support element 601 which surrounds the inner ferrite element 102. Further, the slot 603 may have various widths. For instance, the width may allow accommodating at least two coil windings 115 in juxtaposition.

It should be noted that the inductive coupling support element 601 may, for instance, be referred to as bobbin.

The inductive coupling support element 601 according to FIGS. 6 to 11 and as described in the following in connection with the second embodiment may also be implemented to the contactless connector 100 as shown in FIGS. 1 to 5 and 12 as described above in connection with the first embodiment.

Figure 7:
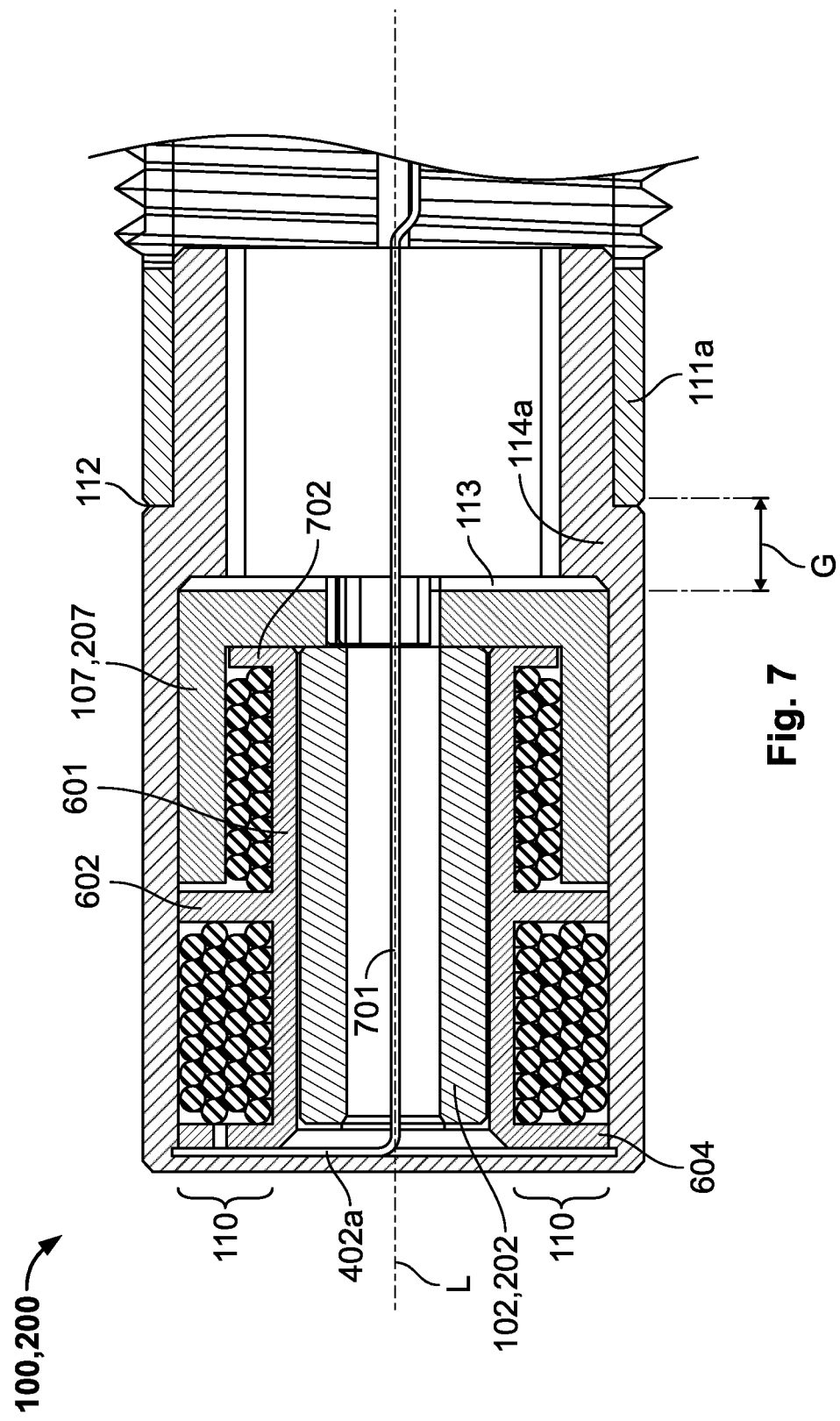
FIG. 7 schematically shows a sectional view of the contactless connector along a longitudinal axis, according to the second exemplary embodiment of the invention.

FIG. 7 schematically shows a sectional view of a contactless connector 100 having incorporated an inductive coupling support element 601 as described with regard to FIG. 6 and mounted coil windings 115.

As can be seen in this figure, the inductive coupling support element 601 further comprises a rear disc 702 which is arranged such that the plane of the rear disc 702 is also perpendicular to the axial direction L of the contactless connector 100. The rear disc 702 is displaced from the intermediate disc 602 towards the rear end of the contactless connector 100 along the axial direction of the contactless connector 100 thereby forming a space for accommodating coil windings between said rear disc 702 and said intermediate disc 602. For instance, the rear disc 702 may contact the inner rear portion of the outer ferrite element 107 (termed ferrite core base (disc) in the previous embodiment) as best seen in FIG. 7.

The outer diameters of the front disc 604 and intermediate disc 602 are equal, whereas the outer diameter of the rear disc 702 is less than that of the front and intermediate discs in the embodiment shown in FIG. 7. For example, the respective outer diameter of the discs may be related to the outer diameter of the inductive coupling element 110, i.e. The height of the coil windings layers in respective front and rear sections of the inductive coupling support element 601.

FIG. 7 further exemplarily shows that the front section (i.e. the space between the front disc 604 and the intermediate disc 602) of the inductive coupling support element 601 comprises 4 layers of coil windings 115, whereas the rear section (i.e. the space between the intermediate disc 602 and the rear disc 702) of the inductive coupling support element 601 comprises 2 layers of coil windings 115. According to a further implementation of this embodiment, both sections, the front and rear sections, of the inductive coupling support element 601 comprise an even number of layers of coil windings 115.

The contactless connector 100 includes an antenna configuration including antenna element 402a provided at the mating end 101 of the contactless connector 100 has only one bend at its connection point. That is, the antenna element 402a may, for instance, be contacted by the antenna connection line 701, whereas the antenna connection line 701 contacts the antenna element 402a by a right angle. In this example of the embodiment, there is no need for a (seen in a sectional view) U-shaped antenna element 402 as for instance shown in the embodiment of FIG. 4. Consequently, the antenna element 402a according to this embodiment allows for being mounted directly at the surface of the front disc 604 of the inductive coupling support element 601, thereby providing an even more overall compact structure, in particular in the axial direction L. Furthermore, the antenna connection line 701 may be fed through the inner ferrite element 102. The antenna element 402a is configured to preferably operate at a 2.4 GHz frequency range.

As can further be seen in FIG. 7, the front end 112 of the housing element 111a is recessed with respect to the rear end 113 of the ferrite elements of the contactless connector 100. The distance/gap G therebetween is preferably between 2-3 millimeters, at which tests have shown that the eddy current loss is negligible.

FIG. 7 further illustrates that a non-conductive cover element 114a is provided around the connector arrangement so as to also fill the gap G between the rear end 113 of the ferrite elements and the housing element 111a. In the shown preferred embodiment, the non-conductive cover element is an overmolded part 114a and ensures that the entire connector has a sufficient level of mechanical robustness/stability. Hence, according to this exemplary implementation of the embodiment, there is no need for an overlap between the housing element 111a and the outer surface of outer ferrite element 107 in order to provide mechanical stability of the connector arrangement. This is not only beneficial from a manufacturing point of view, but also provides a more compact connector design in the radial direction. That is, this aspect of this preferred embodiment enables a more compact design due to lack of overlapping sections between the housing element 111a and the outer ferrite element 107.

Figure 8:
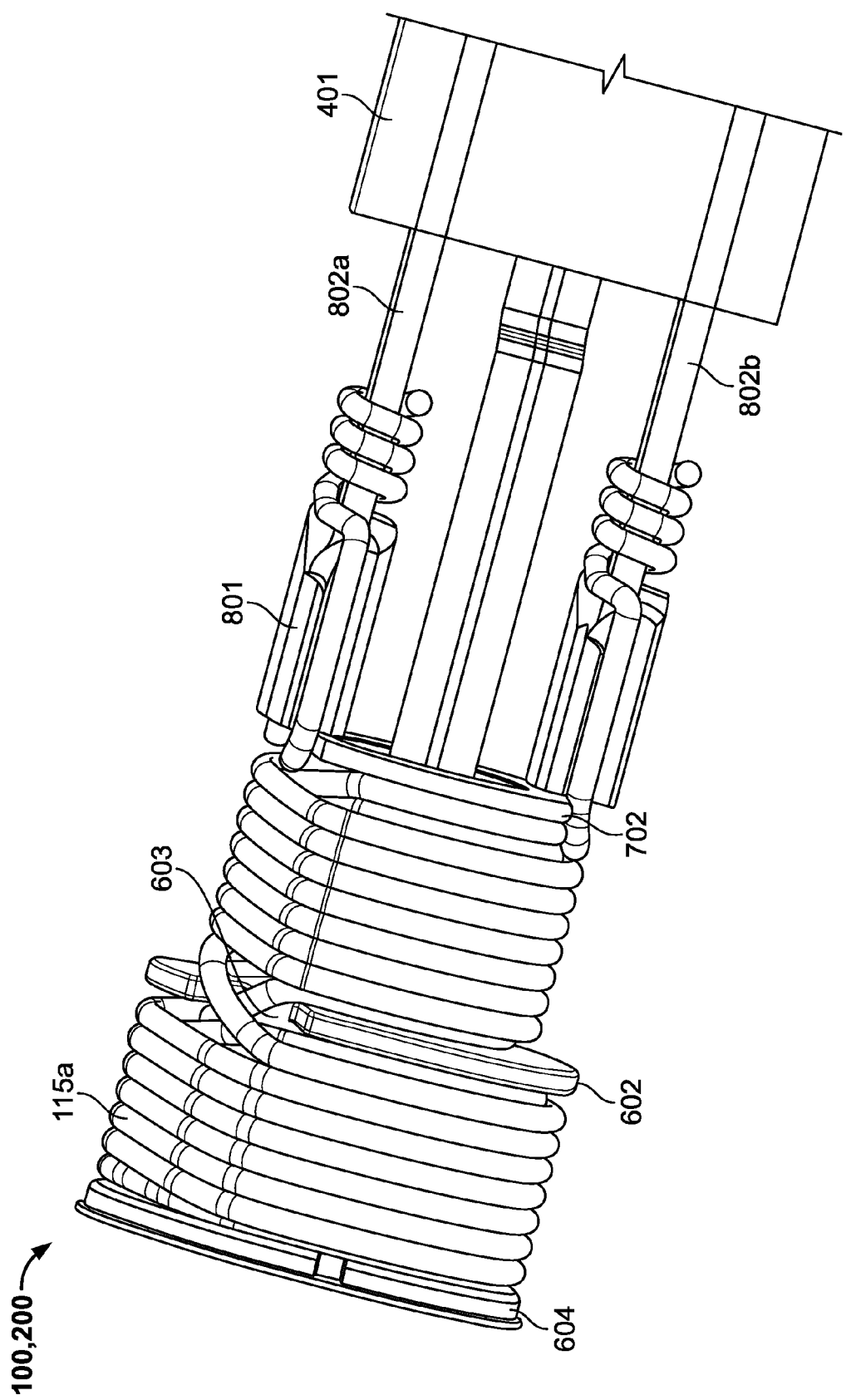
FIG. 8 schematically shows a perspective view of the inductive coupling element and inductive coupling support element of the contactless connector according to the second exemplary embodiment of the invention.

FIG. 8 schematically shows a perspective view of the inductive coupling support element 601, i.e. bobbin, and the coil windings 115a according to FIG. 7, being attached to an electronic circuit 401.

As the front section of the inductive coupling support element 601 may support more winding layers than the rear section of the inductive coupling support element 601, the coil windings intersect in the area of the slot 603 during the automated winding process of the coil windings 115a.

The inductive coupling support element 601, i.e. the bobbin, further comprises two mounting pins 801 which protrude of the rear disc 702 parallel to the axial direction L of the contactless connector 100. These mounting pins 801 hold metallic pins 802a, 802b, respectively as best seen in FIG. 8. The metallic pins 802a, 802b are connected to the electronic circuit 401. Thus, the metallic pins 802a, 802b fulfill a similar function as the coil power supply line 404 as shown in FIG. 4. Hence, the metallic pins 802a, 802b are the supply lines to the coil according to this embodiment.

Figure 9:
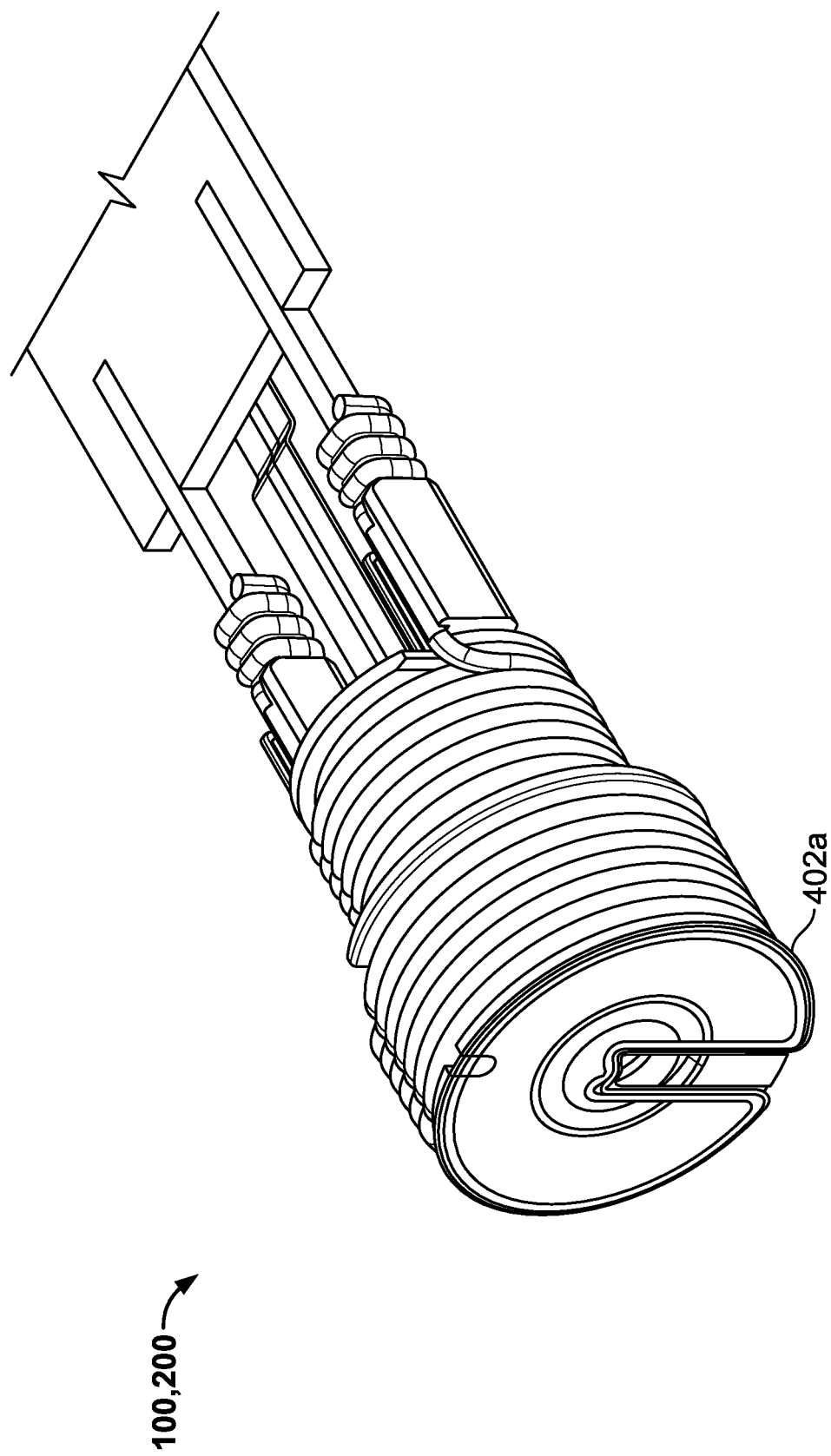
FIG. 9 schematically shows a further perspective view of the inductive coupling element and inductive coupling support element of the contactless connector according to the second exemplary embodiment of the invention.
Figure 11:
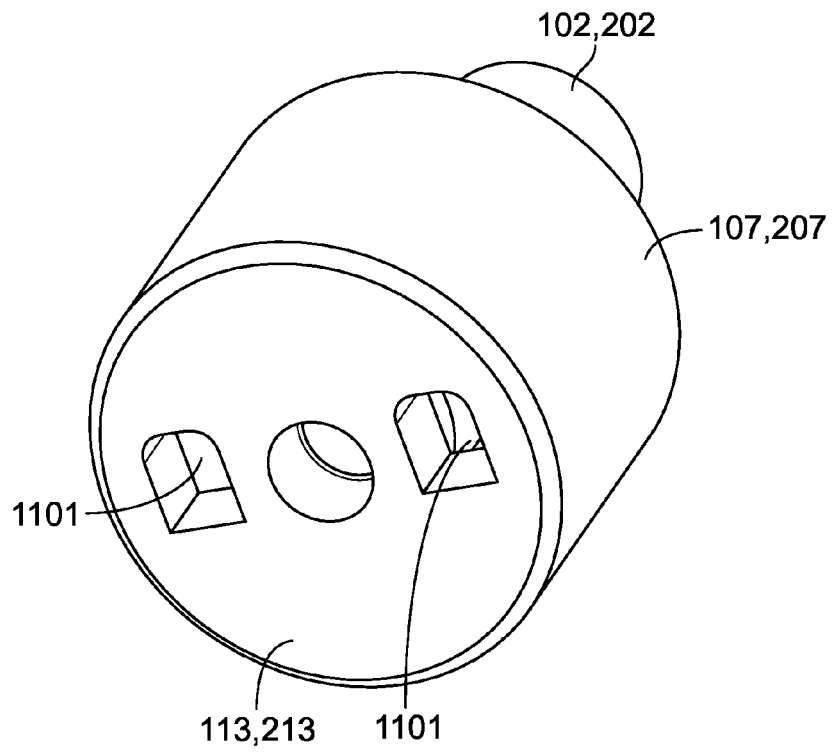
FIG. 11 schematically shows a perspective view of the ferrite elements of a contactless connector according to the second exemplary embodiment of the invention.

The mounting pins 801 of the inductive coupling support element 601, i.e. bobbin 601, protrude through the back surface 113 of the outer ferrite element 107, in particular through the openings 1101 of the outer ferrite element 107 as best seen in FIG. 11. The wire forming the coil is wound around the metallic pins 802a, 802b and fixed thereto. The wire of the coil windings 115a will then be held by the mounting pin 801 as seen in FIG. 8, which has a recess portion adapted to the wire shape. The electrical current flows therefore from the PCB, to the metallic pins 802a, 802b and then through the wire of the coil windings 115a for transmitting/receiving power to/from the corresponding mating connector. Accordingly, the flow of current known to the skilled person is thereby ensured. FIG. 9 illustrates how the antenna element 402a is arranged at the front disc 604 of the inductive coupling support element 601. In this example, the antenna element 402a is circularly arranged along the outside shape of front disc 604 of the bobbin 601.

Figure 10:
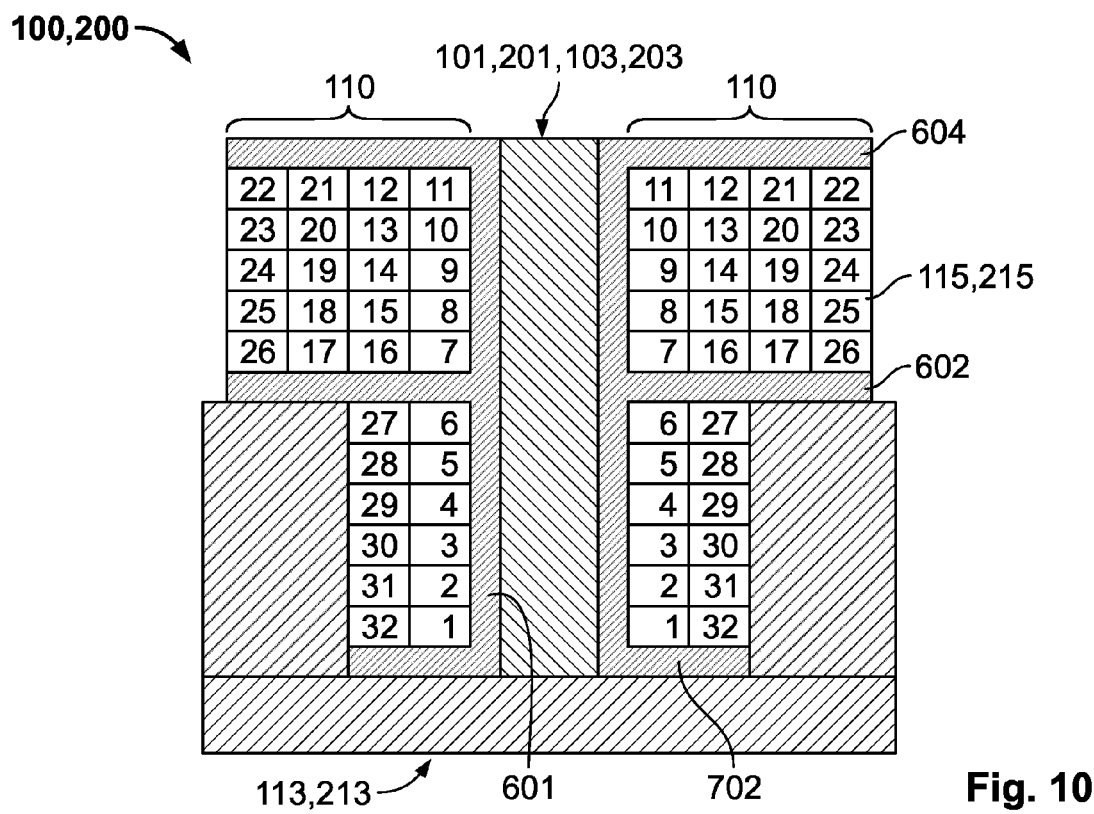
FIG. 10 schematically shows a winding order of the inductive coupling element of the contactless connector in a sectional view along a longitudinal axis of the contactless connector according to the second exemplary embodiment of the invention.

FIG. 10 shows a winding order of the inductive coupling element 110 of the contactless connector 100 in a sectional view along a longitudinal axis of the contactless connector, according to further exemplary embodiment of the invention.

Each rectangle in FIG. 10 comprising a number schematically represents the cross-section of a coil winding 115 (which actually would have a circular shape).

Furthermore, the shaded parts of the sectional illustration in FIG. 10 denote the inductive coupling support element 601 including the front disc 604, intermediate disc 602 and rear disc 702 thereof.

As to the winding order description, the winding starts and ends at the rear disc 702. In particular, before starting the winding process around the bobbin 601, the coil wire is wound around the first metallic pin 802a and then introduced into the bobbin 601. After completion of various layers of coil winding 115a around the bobbin 601—to be described in more detail below—the process is finished by winding the coil wire around the second metallic pin 802b.

This winding process is also illustrated in FIG. 9, which shows that one wire end of the coil wire exiting the bobbin 601—at the rear disc 702 area—is exiting from the uppermost wire layer. Further, FIG. 8 details that another wire end of the coil wire entering the bobbin 601 area enters after being wound around metallic pin 802a, and the wire is arranged in the lower layers once the coil is formed and supported by the bobbin 601. In the following the automated coil winding process will be described in further detail:

In a first step, the first and inner most layer starts from the rear disc 702, wherein a coil 115 is wound around the bobbin 601 into the direction of the front disc 604. According to this example of the embodiment, the coil is routed through the slot 603 of the intermediate disc 602 of the bobbin 601 between the 6$^{th}$ and 7$^{th}$ windings.

In a second step, a second layer of coil windings of the front section of the inductive coupling support element 601, i.e. the bobbin 601, is created by winding the coil 115 from front disc 604 until reaching the intermediate disc 602. Then, the next winding (illustrated by winding 17 in FIG. 10) is provided in a third layer.

In a third step, the third layer is continued until again reaching the front disc 604 (illustrated by winding 21 in FIG. 10). Then, the next winding (illustrated by winding 22 in FIG. 10) is provided in a fourth layer.

In a fourth step, the fourth layer of the front section of the inductive coupling support element 601 is continued until again reaching the intermediate disc 602. Upon routing the wire of the coil through the slot 603, windings are continued at a second layer of the rear section of the inductive coupling support element 601 in the direction to the inner rear portion of the ferrite elements until reaching the rear disc 702 of the bobbin 601.

According to this example, the front section of the inductive coupling support element 601 may comprise 4 layers of coil windings 115, whereas the rear section of the inductive coupling support element 601 may comprise 2 layers of coil windings 115. FIG. 10 relates to an example only and shows that even number of layers of coil windings are obtained in the front and rear sections of the inductive coupling support element 601 by utilizing an automated winding process.

The inner ferrite element 102 may be introduced into the bobbin 601, before, during or after the above described winding process, depending on the preferred manufacturing settings. The bobbin 601 with completed windings is than arranged in the outer ferrite element 107, whereas it is possible to also arrange the inner ferrite element 102 inside the bobbin 601 first after said bobbin 601 with coil windings has been arranged within the outer ferrite element 102. Hence, FIG. 10 shows the assembled stage of the bobbin 601, inner and outer ferrite elements 102, 107.

The front disc 604 can be removed after the coil winding process (not shown). Thus, the bobbin finally mounted into the connector does not necessarily comprise a front disc.

FIG. 11 schematically shows a perspective view of the ferrite elements of the contactless connector 100, according to another exemplary embodiment of the invention.

According to the illustration in this figure, the rear end 113 (which is the bottom) of the outer ferrite element 107 comprises openings 1101 so as to accommodate the mounting pins 801 of the inductive coupling support element 601.

Feeding the power supply lines, i.e. the metallic pins 802a, 802b through the inside of mounting pins 801 further allows for the contactless connector to comply with the M12 form factor. In particular, as the metallic pins then do not have to be routed at the outer surface of the outer ferrite element 107.

Figure 12:
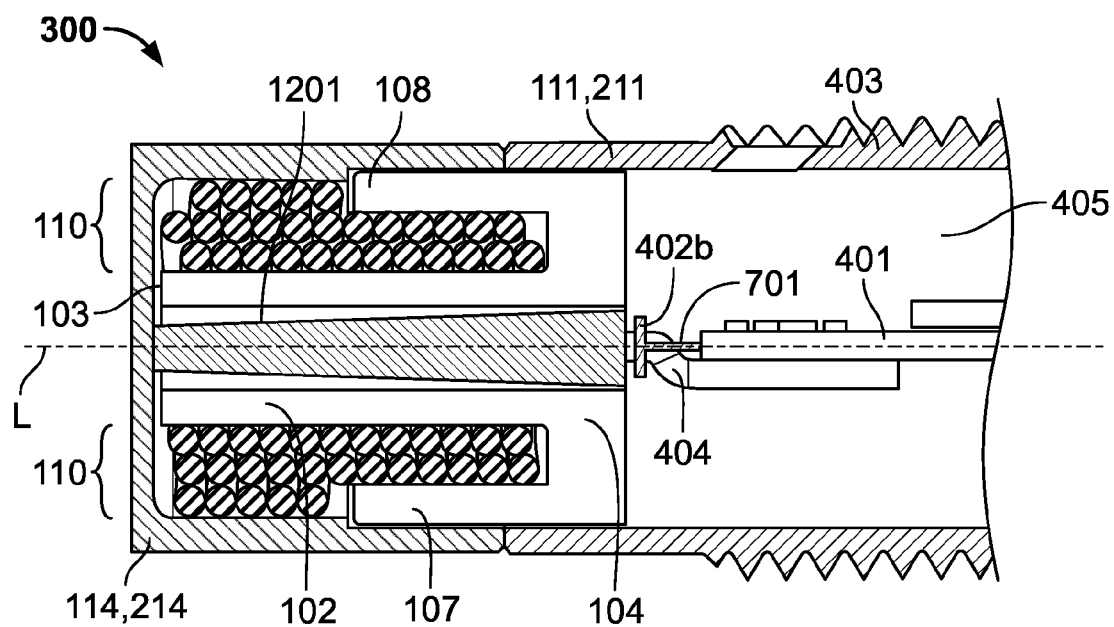
FIG. 12 schematically shows a sectional view of the contactless connector including another antenna configuration along a longitudinal axis, according to the first exemplary embodiment of the invention.

FIG. 12 schematically shows a sectional view, along a longitudinal axis L, of the contactless connector 300 including another antenna configuration. The contactless connector 300 is based on respective contactless connectors 100, 200 as shown in FIGS. 1-5 where corresponding parts are given corresponding reference numerals and terms. The detailed description of corresponding parts has been omitted for reasons of conciseness.

Specifically, the contactless connector includes an inner ferrite element 102; an inductive coupling element 110 arranged to at least partially surround the inner ferrite element 102; and an outer ferrite element 107 arranged to at least partially surround the inductive coupling element 110. The front end 108 of the outer ferrite element 107 facing the mating end is recessed in an axial direction with respect to a front end 103 of the inner ferrite element 102. The rear end 109 of the outer ferrite element 107 is magnetically connected to the rear end 104 of the inner ferrite element 102.

As shown in the various illustrations of the first embodiment, the inner ferrite element 102 has preferably a tubular shape so that the inner ferrite element 102 may be closely arranged around the centre axis, i.e. the longitudinal axis L as shown by the horizontal dash-dotted line. Due to the tubular shape, the inner ferrite element 102 comprises a cylindrical opening along the longitudinal axis. This opening is also referred to as hollow opening 106 of the inner ferrite element 102 in the following. The contactless connector 300 additionally includes an antenna configuration including an antenna element 402b that is arranged behind the inner and/or outer ferrite element 102, 107 with respect to the mating end of the contactless connector 300. In other words, the arrangement of the antenna element 402b is positioned within the contactless connector 300, namely where the inner and/or outer ferrite element 102, 107 is in-between the antenna element 402b and the mating end 103 of the contactless connector 300. For example, the antenna element 402b may be realized having a dipole structure. The antenna element 402b is configured to preferably operate at a 60 GHz frequency range.

Such an arrangement of the antenna element 402b within the contactless connector 300 allows for an overall compact structure of the contactless connector 300 since the non-conductive cover element 114, surrounding the inner ferrite element 102, the inductive coupling element 110 and the outer ferrite element 107, can be made thinner at the front portion of the connector in direction of the longitudinal axis L. In other words, the non-conductive cover element does no longer need to protect and/or encapsulate the antenna element 402 or 402a as shown in FIG. 4 or 7. Consequently, this arrangement allows for a reduced overhang of the non-conductive cover element 114 with respect to the front end of the inner ferrite element 103 and thereby improves the power transmission efficiency between the inductive coupling element 110 of the contactless connector and the corresponding contactless connector in the mated state.

To ensure efficient signal transmission by the antenna element 402b—arranged behind the inner and/or outer ferrite element 102, 107 with respect to the mating end of the contactless connector 300—the antenna configuration of the contactless connector 300 additionally includes an antenna rod 1201 provided within the opening of the inner ferrite element 102 of contactless connector 300 for forwarding electromagnetic waves between the mating end of the contactless connector 300 and the antenna element 402b.

Specifically, the antenna rod 1201 has a conical shape where the front side of the antenna rod 1201 (i.e. the side of the antenna rod 1201 facing the mating end of the contactless connector 300) has a smaller diameter than the opposite side of the antenna rod 1201. The lateral dimensions of the antenna rod 1201 are adapted to the inner diameter of the inner ferrite element 102. The tapered configuration of the antenna rod 1201 allows for a radiating pattern of the antenna configuration which is focussed in the direction of the mating end of the contactless connector. Additionally, the surface of inner ferrite element 102 may be adapted to improve reflection the electromagnetic waves carried by the antenna element rod 1201 so as to act as a waveguide for the antenna element 402b.

Further, the antenna rod 1201 extends between the front end of the inner ferrite element 103 and the rear end of the inner ferrite element 104. The antenna rod 1201 is also adapted to a wavelength of a carrier frequency of the antenna element 402b. In more detail, the length of the antenna rod 1201 corresponds to the carrier frequency according to a predefined ratio, e.g. integer multiples of the wavelength of the carrier frequency. The antenna rod 1201 shown in FIG. 12 is suitable for carrying radio waves with a carrier frequency approximately 60 GHz.

The antenna element 402b is electrically connected to the electronic circuit 401 including a transmitting/receiving circuit for wireless data transfers. Additionally, the antenna element 402b is arranged within the contactless connector 300 at close proximity to the inwardly facing side of the antenna rod 1201, specifically at a distance which allows for a highly efficient electromagnetic coupling between the antenna element 402b and the antenna rod 1201.

As can be readily appreciated from the description of the contactless plug connectors above, the antenna configuration including the antenna element 402b and the antenna rod 1201 is an alternative to the antenna element 402 as shown in FIG. 4 and the antenna element 402a shown in FIG. 7. Accordingly, the above described antenna configuration, namely including the antenna element 402b and the antenna rod 1201, may also be incorporated into the contactless connector of the second embodiment, i.e. the embodiment including the bobbin 601.

For the contactless connector 100 of the second embodiment as shown e.g. in FIG. 7, instead of antenna element 402a, the antenna element 402b can be arranged behind the inner and/or outer ferrite element 102, 107 with respect to the mating end of the contactless connector. At the same time, the antenna rod 1201 can be provided within the inner ferrite element 102 such that it has a radiating pattern in the direction of the mating end of the contactless connector. The antenna rod 1201 is connected to the antenna element 402b transmitting/receiving electromagnetic waves via the mating end of the contactless connector.

References

| Reference Numerals | Description |
| --- | --- |
| 100, 300 | Contactless connector |
| 101, 201 | Mating end of the contactless connector |
| 102, 202 | Inner ferrite element |
| 103, 203 | Front end of the inner ferrite element |
| 104, 204 | Rear end of the inner ferrite element |
| 105, 205 | Outer surface of the inner ferrite element |
| 106, 206 | Hollow opening |
| 107, 207 | Outer ferrite element |
| 108, 208 | Front end of the outer ferrite element |
| 109, 209 | Rear end of the outer ferrite element |
| 110 | Inductive coupling element |
| 111, 211 | Housing element |
| 112, 212 | Front end of the housing element |
| 200 | Corresponding mating connector |
| 113, 213 | Rear end of the ferrite elements of the contactless connector |
| 114, 214 | Non-conductive cover element |
| 401 | Electronic circuit |
| 402, 402a, 402b | Antenna element |
| 115, 215 | Windings |
| 216 | Magnetic field lines |
| 217 | Air gap |
| 403 | Thread |
| 404 | Coil power supply line |
| 501 | Connector case |
| 405 | Potting |
| 502 | Connection interface |
| 601 | Inductive coupling support element |
| 602 | Intermediate disc |
| 603 | Slot |
| 604 | Front disc |
| 701 | Antenna connection line |
| 702 | Rear disc |
| 801 | Mounting pin |
| 802a, 802b | Metallic pins |
| 1101 | Openings of the rear disc |
| 1201 | Antenna rod |
| L | Axial/Longitudinal direction of contactless connector |
| G | Gap between housing element 111a and rear end 113 of the ferrite elements in longitudinal direction |

The invention claimed is:

1. A contactless connector for inductively connecting to a corresponding mating connector at a mating end of the contactless connector, the contactless connector comprising:
   an inner ferrite element;
   an inductive coupling element arranged to at least partially surround the inner ferrite element for transmitting or receiving power to or from the corresponding mating connector;
   an outer ferrite element arranged to at least partially surround the inductive coupling element along an axial length of the inductive coupling element, wherein a front end of the outer ferrite element facing the mating end is recessed such that the outer ferrite element is shorter than the length of the inner ferrite element in an axial direction of the contactless connector with respect to a front end of the inner ferrite element facing the mating end, and wherein a rear end of the outer ferrite element is magnetically connected to a rear end of the inner ferrite element; and
   an inductive coupling support element arranged around the inner ferrite element;
   wherein said inductive coupling element is a wire wound to form a coil comprising a plurality of coil windings that are wound around the inductive coupling support element;
   wherein said inductive coupling support element comprises an outwardly extending intermediate disc that divides the coil windings into a first coil winding section and a second coil winding section;

wherein the intermediate disc has a slot forming a coil wire passageway through which the coil wire is routed; and wherein the coil comprises more winding layers in a first section at a front part of the inner ferrite element that is not surrounded by the outer ferrite element than in a second section at a rear part of the inner ferrite element that is surrounded by the outer ferrite element.

2. The contactless connector according to claim 1, the inductive coupling element is radially arranged around the inductive coupling support element.

3. The contactless connector according to claim 1, wherein the coil comprises an even number of layers in the first and second sections.

4. The contactless connector according to claim 1, further comprising a non-conductive cover element arranged to surround the inner ferrite element, the inductive coupling element and at least part of the outer ferrite element.

5. The contactless connector according to claim 4, wherein the non-conductive cover element is overmolded.

6. The contactless connector according to claim 1, further comprising a housing element which is spaced from the rear end of the outer ferrite element by a predetermined distance with regard to the axial direction of the contactless connector.

7. The contactless connector according to claim 1, further comprising at least one antenna element.

8. The contactless connector according to claim 7, further comprising an antenna connection line for connecting the antenna element, wherein the antenna connection line is routed through the ferrite element.

9. A contactless connector system comprising a contactless connector according to claim 1, and a corresponding mating connector connected to the contactless connector such that the contactless connector allows for transmitting/receiving power to/from the corresponding mating connector.

10. A method for manufacturing a contactless connector, the method comprising the steps of:
providing an inductive coupling support element comprising an outwardly extending intermediate disc having a slot;
arranging an inductive coupling element around the inductive coupling support element by winding a wire to form a coil comprising a plurality of coil windings that are wound around the inductive coupling support element into a first coil winding section and a second coil winding section;
inserting an inner ferrite element into a recess of the inductive coupling support element; and
enclosing, by an outer ferrite element, at least a part of the inductive coupling element, which is arranged around the inductive coupling support element, wherein a front end of the outer ferrite element facing the mating end is recessed such that the outer ferrite element is shorter than the length of the inner ferrite element in an axial direction of the contactless connector with respect to a front end of the inner ferrite element facing the mating end;
providing more winding layers in a first section at a front part of the inner ferrite element that is not surrounded by the outer ferrite element than in a second section at a rear part of the inner ferrite element that is surrounded by the outer ferrite element;
wherein the method further comprises the step of routing the coil wire through the slot while forming the coil winding sections.

11. The method according to claim 10, further comprising the steps of:
providing an antenna element within the contactless connector; and
providing a non-conductive cover element so as to surround the inductive coupling support element, the inductive coupling element, the inner ferrite element, the outer ferrite element, and the antenna element.

* * * * *